(12) United States Patent
Takimura

(10) Patent No.: US 7,597,128 B2
(45) Date of Patent: Oct. 6, 2009

(54) RUBBERIZED FIBER MATERIAL AND PNEUMATIC TIRE

(75) Inventor: Mamoru Takimura, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 120 days.

(21) Appl. No.: 10/550,553

(22) PCT Filed: Mar. 22, 2004

(86) PCT No.: PCT/JP2004/003815

§ 371 (c)(1),
(2), (4) Date: Sep. 26, 2005

(87) PCT Pub. No.: WO2004/089655

PCT Pub. Date: Oct. 21, 2004

(65) Prior Publication Data

US 2006/0213597 A1    Sep. 28, 2006

(30) Foreign Application Priority Data

Apr. 2, 2003  (JP)  ............................ 2003-098800
Apr. 2, 2003  (JP)  ............................ 2003-098866

(51) Int. Cl.
B60C 1/00 (2006.01)
B60C 9/02 (2006.01)
B60C 9/18 (2006.01)
B32B 25/02 (2006.01)
B32B 25/12 (2006.01)

(52) U.S. Cl. .................. 152/451; 152/526; 152/527; 152/537; 152/548; 152/556; 152/564; 428/221; 428/295.1

(58) Field of Classification Search ................ 152/451, 152/526, 527, 537, 548, 556, 564; 428/221, 428/295.1
See application file for complete search history.

(56) References Cited

U.S. PATENT DOCUMENTS

| 4,628,977 | A | * | 12/1986 | Ogino et al. | ................ | 152/451 |
| 4,675,355 | A | * | 6/1987 | Hirata et al. | ................ | 524/236 |
| 4,987,939 | A | * | 1/1991 | Yamada et al. | .............. | 152/556 |
| 5,194,210 | A | * | 3/1993 | Lommerts et al. | ........... | 264/184 |
| 5,205,882 | A | * | 4/1993 | Ueyoko et al. | ............... | 152/527 |
| 6,184,296 | B1 | * | 2/2001 | Obrecht et al. | .............. | 525/232 |
| 6,807,994 | B2 | * | 10/2004 | Westermann et al. | ....... | 152/450 |

FOREIGN PATENT DOCUMENTS

| JP | 57-55203 | A |   | 4/1982 |
| JP | 57-151404 | A |   | 9/1982 |
| JP | 05-294101 | A |   | 11/1993 |
| JP | 06220252 |   | * | 8/1994 |
| JP | 11-334313 | A |   | 12/1999 |
| JP | 2001-239807 | A |   | 9/2001 |

* cited by examiner

Primary Examiner—Justin Fischer
(74) Attorney, Agent, or Firm—Sughrue Mion, PLLC

(57) ABSTRACT

A rubberized fiber material is used in a belt reinforcing layer of a pneumatic tire, and comprises polyketone fibers having substantially a repeat unit represented by the following formula (I):

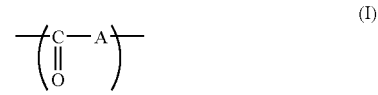

(wherein A is a moiety derived from an ethylenically unsaturated compound polymerized through ethylenic linkage, and may be same or different in repeat units) and a coating rubber covering the fibers, in which the coating rubber has a modulus at 100% elongation (room temperature) of not less than 2.5 MPa but not more than 5.5 MPa and a rebound resilience of not less than 60%. Also, a pneumatic tire comprises a belt reinforcing layer made from the rubberized fiber material.

6 Claims, No Drawings

RUBBERIZED FIBER MATERIAL AND PNEUMATIC TIRE

TECHNICAL FIELD

This invention relates to a rubberized fiber material for a belt reinforcing layer comprising polyketone fibers and a coating rubber, and more particularly to a pneumatic tire comprising a belt reinforcing layer made from such a rubberized fiber material.

Also, the invention relates to a rubberized fiber material for a carcass ply comprising polyketone fibers and a coating rubber, and more particularly to a pneumatic tire comprising a carcass ply made from such a rubberized fiber material.

BACKGROUND ART

In the belt of the radial tire for passenger car are used at least two or more angled steel belt layers at the present time. Also, in order to ensure the stability during the running and particularly prevent the separation of the belt layer during the running at a high speed (particularly separation remarkably caused at the end portion of the belt layer) and improve the durability, it is general to adopt a cap-layer structure.

The cap-layer means a ply formed by continuously and spirally winding in a circumferential direction of the tire, which may be called as a belt reinforcing layer. The "cap-layer" is called as "belt reinforcing layer" hereinafter.

As a cord material of the belt reinforcing layer is generally used nylon. However, nylon is unsuitable from a viewpoint of characteristics recently required in parts of a new product (Original Equipment: OE). As a problem is particularly mentioned road noise, decrease of flat spots, or poor protruding property of the end portion in the belt reinforcing layer during the running at the high speed, and it is demanded to solve such a problem.

As a countermeasure, it is proposed to apply polyketone fibers to the belt reinforcing layer. The polyketone fiber is high in the modulus of elasticity as compared with nylon and has no glass transition temperature (Tg), so that it can expect the effect of controlling the road noise, the decrease of flat spots or the protruding (see, for example, Patent Article 1: JP-A-2000-142025 and Patent Article 2: JP-A-2001-334811).

In general, fibers of polyethylene terephthalate (hereinafter referred to as PET simply) are used in a carcass ply of a radial tire for a passenger car. Also, rayon fibers are used in the carcass ply of tires for ultra-high performance (Ultra High Performance) vehicles recently demonstrating an upward trend or tires having such a size that heat buildup in a side portion of the tire is severe.

However, the PET fibers have a problem in the adhesion property at high temperatures (resistance to thermal adhesion) and may not be followed to the upward tread of the recent high performance vehicles, while the rayon fibers have a difficulty in view of feeding with respect to the upward trend of the high performance vehicles, so that aliphatic polyketone fibers having a high elasticity and an excellent resistance to thermal adhesion are noticed instead of the above two materials (see, for example, Patent Article 3: JP-A-2000-190705, Patent Article 4: JP-A-2000-264012, Patent Article 5: JP-A-2001-334807 and Patent Article 6: JP-A-2002-307908).

The inventor has found that there is a fear of causing the following problem in the conventional techniques (see the Patent Articles 1 and 2).

When the coating rubber in the use of nylon as a belt reinforcing layer is combined with the polyketone fibers as it is, there is produced the effect of controlling the protruding by using the polyketone fibers, but the stepwise difference of the rigidity at the interface between rubber and cord becomes large to bring about the stress concentration and hence the high speed durability (HSP drum level) does not reach to a significant HSP drum-up.

Further, the inventor has found that there is a fear of causing the following problem in the conventional techniques (see the Patent Articles 3-6).

When the aliphatic polyketone fibers are used in the carcass ply, since they are high in the elasticity and excellent in the resistance to thermal adhesion as compared with PET and rayon, it should be expected to largely improve the performances in the evaluation on durability (drum test) applying a load to a region ranging from the side portion to the bead portion in the tire or the like. According to the inventor's studies, however, it has been found that when the coating rubber for a treat in case of using PET and rayon in the carcass ply is combined with the aliphatic polyketone fibers, the stepwise difference of the rigidity at the interface between rubber and cord becomes large to bring about the stress concentration and hence it is not connected to the significant drum-up.

It is an object of the invention to rationalize the rigidity balance between the polyketone fibers and the coating rubber covering them, loss characteristic and the like for solving the above problems.

DISCLOSURE OF THE INVENTION

The invention is a rubberized fiber material used in a belt reinforcing layer of a pneumatic tire, and is characterized in that the rubberized fiber material comprises polyketone fibers having substantially a repeat unit represented by the following formula (I):

(wherein A is a moiety derived from an ethylenically unsaturated compound polymerized through ethylenic linkage, and may be same or different in repeat units) and a coating rubber covering the fibers, and the coating rubber has a modulus at 100% elongation (room temperature) of not less than 2.5 MPa but not more than 5.5 MPa and a rebound resilience of not less than 60%. Also, the invention is a pneumatic tire comprising a belt reinforcing layer made of such a rubberized fiber material.

Furthermore, the invention is a rubberized fiber material used in a carcass ply of a pneumatic tire, and is characterized in that the rubberized fiber material comprises polyketone fibers having substantially a repeat unit represented by the formula (I) and a coating rubber covering the fibers, and the coating rubber has a modulus at 100% elongation (room temperature) of not less than 2.5 MPa but not more than 5.5 MPa. Also, the invention is a pneumatic tire comprising a carcass ply made of such a rubberized fiber material.

The invention is based on a knowledge that a pneumatic tire having an excellent high-speed durability is obtained by defining the property of rubber covering the polyketone fibers to a given range of the modulus at 100% elongation (room temperature)("modulus at 100% elongation" may be simply referred to as "$M_{100}$" hereinafter) of not less than 2.5 MPa but not more than 5.5 MPa and applying the thus formed rubberized fiber material to the belt reinforcing layer.

Also, the invention is based on a knowledge that a pneumatic tire having an excellent durability is obtained by defining the property of rubber covering the polyketone fibers to a given range of the modulus at 100% elongation (room temperature) of not less than 2.5 MPa but not more than 5.5 MPa and applying the thus formed rubberized fiber material to the carcass ply.

The inventor has examined the properties of the coating rubber when the polyketone fibers are used as a material of the belt reinforcing layer in radial tires for passenger cars.

As a result, the inventor has found out that the stepwise difference of the rigidity at the interface between the cord made from the polyketone fiber and rubber is made small by defining the property of the coating rubber to a given range, which is different from the coating rubber in case of using nylon as the belt reinforcing layer, to control the stress concentration and it is connected to a significant drum-up, and the invention has been accomplished.

According to the inventor's studies, the following relationship is recognized as to the functions of the belt and the belt reinforcing layer. The belt comprises belt cords such as steel cords and a belt coating rubber covering them likewise the belt reinforcing layer. The belt coating rubber is desirable to have a high elasticity in a point that interlaminar shearing strain produced between two angled cross belt layers is controlled while ensuring the adhesion to the belt cords, and the lower limit of the elasticity is usually defined. On the other hand, it is unchangeable that the coating rubber for the belt reinforcing layer is desirable to have a high elasticity only in a point that strain at the end portion of the belt is controlled. However, the belt reinforcing layer contacts with the tread rubber together with the belt at the opposite sides as a position of arranging the member, so that if the elasticity of the coating rubber is too high, the stepwise difference of the rigidity becomes inversely larger between the tread and the belt reinforcing layer and hence the high-speed durability is damaged. Therefore, it is required to define the optimum elasticity range in the coating rubber used for the belt reinforcing layer or the like as defined in the invention.

Also, the inventor has examined the properties of the coating rubber when the polyketone fibers are used as a material of the carcass ply in radial tires for passenger cars.

As a result, the inventor has found out that the stepwise difference of the rigidity at the interface between the cord made from the polyketone fiber and rubber is made small by defining the property of the coating rubber to a given range, which is different from the coating rubber for the treat in case of using PET and rayon as the carcass ply, to control the stress concentration and it is connected to a significant drum-up, and the invention has been accomplished.

In the invention, the rubberized fiber material having considerably excellent rigidity balance of polyketone fibers/rubber and loss characteristic can be obtained by applying the coating rubber having a given high elasticity and low loss to the polyketone fibers having a high elasticity and a high loss.

BEST MODE FOR CARRYING OUT THE INVENTION

The embodiments carrying out the invention are explained below.

(1) Rubberized Fiber Material

It comprises polyketone fibers and a coating rubber covering the fibers. It may be used for the belt reinforcing layer. It can have shape and properties suitable for use in the belt reinforcing layer. It may contain fibers other than the polyketone fiber such as nylon fibers, rubber covering such a fiber, other rubber layer, a filler and the like. This rubberized fiber material can be used in the belt reinforcing layer as it is, but can be applied to a final product, particularly a belt reinforcing layer of a pneumatic tire through various intermediate products by subsequent suitable treatments.

Also, the rubberized fiber material may be used in the carcass ply. It can have shape and properties suitable for use in the carcass ply. It may contain fibers other than the polyketone fiber such as PET fibers and rayon fibers, rubber covering such a fiber, other rubber layer, a filler and the like. This rubberized fiber material can be used in the carcass ply as it is, but can be applied to a final product, particularly a carcass ply of a pneumatic tire through various intermediate products by subsequent suitable treatments.

(2) Polyketone Fiber

The polyketone is a copolymer alternately arranging CO unit (carbonyl group) and a unit derived from an ethylenically unsaturated compound in its molecule, or has a structure that olefin unit such as ethylene unit or the like is positioned adjacent to each CO unit in the high molecular chain. Also, the polyketone may be a copolymer of carbon monoxide and one specified ethylenically unsaturated compound, or a copolymer of carbon monoxide and two or more ethylenically unsaturated compounds. As the ethylenically unsaturated compound forming moiety A in the formula (I) are mentioned ethylene, propylene, butene, pentene, hexene, heptene, octene, nonene, decene, dodecene, an unsaturated hydrocarbon compound such as styrene or the like, methylacrylate, methylmethacrylate, vinyl acetate, an unsaturated carboxylic acid or a derivative thereof such as undecenic acid or the like, undecenol, 6-chlorohexene, N-vinylpyrolidone, a diethyl ester of sulfonylphosphic acid and so on. They may be used alone or in a combination of two or more. Particularly, a polyketone mainly using ethylene as an ethylenically unsaturated compound is preferable from a viewpoint of dynamic characteristics and heat resistance and the like of the polymer.

When ethylene is used together with the other ethylenically unsaturated compound, it is preferable to use ethylene in an amount of not less than 80 mol % per all of the ethylenically unsaturated compounds. When the amount is less than 80 mol %, the melting point of the resulting polymer is not higher than 200° C., and the heat resistance of the resulting organic fiber cord may become insufficient. The amount of ethylene used is preferable to be not less than 90 mol % per all of the ethylenically unsaturated compounds from a viewpoint of the dynamic characteristics and heat resistance of the organic fiber cord. The polyketone can be produced by a well-known method, for example, a method described in EP 121965 A1, EP 213671 A1, EP 229408 A1 or U.S. Pat. No. 3,914,391.

As the polymerization degree of the polyketone used in the organic fiber cord according to the invention, it is preferable that a solution viscosity measured at 60° C. in m-cresol is within a range of 1.0-10.0 dL/g. When the solution viscosity is less than 1.0 dL/g, the dynamic strength of the resulting organic fiber cord may become insufficient. From a viewpoint of the dynamic strength of the cord, the solution viscosity is further preferable to be not less than 1.2 dL/g. On the other hand, when the solution viscosity exceeds 10.0 dL/g, the melt viscosity or solution viscosity in the formation of the fiber is too high and the spinnability may be poor. From a viewpoint of the spinnability, the solution viscosity is further preferable to be not more than 5.0 dL/g. Considering the dynamic strength and spinnability of the fiber, the solution viscosity is particularly preferable within a range of 1.3-4.0 dL/g.

The method of forming the polyketone fiber is not particularly limited, but a melt spinning method or a solution spinning method is generally adopted. In case of adopting the melt spinning method, the polymer is melt-spun at a temperature higher by 20° C. or more than the melting point, preferably a temperature higher by about 40° C. than the melting point according to a method described, for example, in JP-A-1-124617, and then subjected to a drawing treatment at a temperature lower by 10° C. or more than the melting point, preferably a temperature lower by about 40° C. than the melting point and at a drawing ratio of 3 times or more, preferably a drawing ratio of 7 times or more, whereby the desired fibers can be easily obtained.

In case of adopting the solution spinning method, the polymer is dissolved in, for example, hexafluoroisopropanol, m-cresol or the like at a concentration of 0.25-20% by mass, preferably 0.5-10% by mass and extruded through a spinning nozzle to form a fiber according to a method described, for example, in JP-A-2-112413, and then the solvent is removed and washed in a non-solvent bath of toluene, ethanol, isopropanol, n-hexane, isooctane, acetone, methylethyl ketone or the like, preferably an acetone bath to obtain a spun yarn, which is subjected to a drawing treatment within a temperature range of (melting point−100° C.) to (melting point+10° C.), preferably (melting point−50° C.) to (melting point), whereby the desired filament can be obtained. Also, the polyketone is preferable to be added with an antioxidant for the purpose of providing a sufficient durability against heat, oxygen or the like, and may be compounded with a delusterant, a pigment, an antistatic agent and the like, if necessary.

(3) Coating Rubber

It is rubber covering the polyketone fibers (hereinafter referred to as "PK fiber" simply). This coating rubber has a $M_{100}$ of not less than 2.5 MPa but not more than 5.5 MPa. When the $M_{100}$ is outside the above range, the separation property at the interface between the fibers and the rubber (which can be detected, for example, by a drum such as HSP drum or the like) is deteriorated due to the influence of the stepwise difference in the rigidity between the PK fibers and the coating rubber.

Such a coating rubber has a high elasticity approximately equal to that of the PK fiber and a low loss as compared with the PK fiber. This coating rubber having the high elasticity and low loss can rationalize the rigidity balance of PK fibers/rubber and loss character-istic as a rubberized fiber material. Preferably, the coating rubber has a rebound resilience (Resilience) of not less than 60%.

The coating rubber may take various shapes as long as it covers the PK fibers. Typically, there are a film, a sheet and the like.

The coating rubber may be comprised of various rubber compositions. Such a rubber composition is formed by compounding the rubber component with various additives, if necessary. Typically, the rubber composition is a vulcanized rubber composition subjected to a vulcanization treatment.

(4) Covering

It is carried out so as to form the above coating rubber. The PK fibers are covered according to the well-known method such as immersion, application, lamination or the like using the rubber composition. The PK fiber may be subjected to a pre-treatment prior to the covering with rubber.

The covered PK fibers after the covering may be subjected to an arbitrary post-treatment so as to form the coating rubber having given properties. In case of covering with the non-cured rubber composition, the fibers may be subjected to a subsequent vulcanization treatment.

(5) Belt Reinforcing Layer

It comprises the PK fibers and the coating rubber covering the fibers. This belt reinforcing layer may be made from the above rubberized fiber material. The belt reinforcing layer is arranged in a given position of a pneumatic tire.

In case of using the aforementioned non-cured rubber composition, the rubberized fiber material for the belt reinforcing layer can be obtained by vulcanizing the covered PK fibers at the given position of the pneumatic tire.

The belt reinforcing layer may have various shapes, arrangements, covered forms and the like of the PK fibers as far as the properties of the coating rubber are not damaged.

(6) Carcass Ply

It comprises the PK fibers and the coating rubber covering the fibers. This carcass ply may be made from the above rubberized fiber material. The carcass ply is arranged in a given position of a pneumatic tire.

In case of using the aforementioned non-cured rubber composition, the rubberized fiber material for the carcass ply can be obtained by vulcanizing the covered PK fibers at the given position of the pneumatic tire.

The carcass ply may have various shapes, arrangements, covered forms and the like of the PK fibers as far as the properties of the coating rubber are not damaged.

(7) Pneumatic Tire

It comprises the aforementioned belt reinforcing layer or carcass ply. The arrangement or the like of the belt reinforcing layer or carcass ply can be variously set as in the well-known pneumatic tire. Such a pneumatic tire includes various tires such as tire for passenger car, safety tire, heavy duty tire and the like.

The invention will be described in detail with reference to examples below.

EXAMPLE 1

There is prepared a rubberized fiber material for a belt reinforcing layer comprising cords and coating rubber shown in Table 1. A material of the cord is a PK fiber, and a structure of the cord is 1670/2 dtex. The coating rubber is made from a compounding recipe shown in Table 1 and has $M_{100}$ (room temperature) of 2.5 MPa, $M_{100}$ (100° C.) of 1.8 MPa and a rebound resilience of 66%. Moreover, the $M_{100}$ and rebound resilience of the coating rubber are measured according to JIS-K-6251-1993 and JIS-K-6255-1996, respectively.

EXAMPLE 2

A rubberized fiber material is prepared in the same manner as in Example 1 except that the amount of carbon black HAF is changed from 40 parts by mass in Example 1 to 42 parts by mass and the $M_{100}$ (room temperature), $M_{100}$ (100° C.) and rebound resilience of the coating rubber are changed to 3.0 MPa, 2.1 MPa and 70%, respectively.

EXAMPLE 3

A rubberized fiber material is prepared in the same manner as in Example 1 except that the amount of carbon black HAF is changed from 40 parts by mass in Example 1 to 45 parts by mass and the amount of sulfur is changed from 2 parts by mass to 2.5 parts by mass and the $M_{100}$ (room temperature), $M_{100}$ (100° C.) and rebound resilience of the coating rubber are changed to 4.5 MPa, 2.9 MPa and 72%, respectively.

EXAMPLE 4

A rubberized fiber material is prepared in the same manner as in Example 1 except that the amount of carbon black HAF is changed from 40 parts by mass in Example 1 to 48 parts by mass and the amount of sulfur is changed from 2 parts by mass to 2.7 parts by mass and the $M_{100}$ (room temperature), $M_{100}$ (100° C.) and rebound resilience of the coating rubber are changed to 5.0 MPa, 3.3 MPa and 72%, respectively.

COMPARATIVE EXAMPLE 1

A rubberized fiber material is prepared in the same manner as in Example 1 except that the cord material in Example 1 is changed to nylon and the cord structure is changed to 1400/2 dtex and the amount of carbon black HAF is changed from 40 parts by mass to 38 parts by mass and the $M_{100}$ (room temperature), $M_{100}$ (100° C.) and rebound resilience of the coating rubber are changed to 2.0 MPa, 1.5 MPa and 60%, respectively.

COMPARATIVE EXAMPLE 2

A rubberized fiber material is prepared in the same manner as in Example 2 except that the cord material in Example 2 is changed to nylon and the cord structure is changed to 1400/2 dtex.

COMPARATIVE EXAMPLE 3

A rubberized fiber material is prepared in the same manner as in Example 1 except that the amount of carbon black HAF is changed from 40 parts by mass in Example 1 to 38 parts by mass and the $M_{100}$ (room temperature), $M_{100}$ (100° C.) and rebound resilience of the coating rubber are changed to 2.0 MPa, 1.5 MPa and 60%, respectively.

COMPARATIVE EXAMPLE 4

A rubberized fiber material is prepared in the same manner as in Example 2 except that the amount of carbon black HAF is changed from 42 parts by mass in Example 2 to 44 parts by mass and the $M_{100}$ (100° C.) and rebound resilience of the coating rubber are changed to 2.2 MPa and 55%, respectively.

COMPARATIVE EXAMPLE 5

A rubberized fiber material is prepared in the same manner as in Example 4 except that the amount of carbon black HAF is changed from 48 parts by mass in Example 4 to 53 parts by mass and the $M_{100}$ (room temperature), $M_{100}$ (100° C.) and rebound resilience of the coating rubber are changed to 6.0 MPa, 3.9 MPa and 65%, respectively.

(Evaluation of Performances)

Each of the rubberized fiber materials obtained in Examples 1-4 and Comparative Examples 1-5 is used in a belt reinforcing layer of a tire for a passenger car, and the protruding amount at an end portion of a belt layer and the high-speed durability are evaluated. The results are shown in Table 1.

Protruding Amount at End Portion of Belt Layer

A test tire having a tire size of 195/65R14 and mounted onto a rim of 6J-14 under a tire internal pressure of 200 kPa is run at a speed of 150 km/h to measure a protruding amount at a shoulder region (high-speed deformation). The protruding amount is calculated by an index on the basis that Comparative Example 1 is 100, in which the index value exceeds 100 in a direction of reducing the protruding amount (good direction).

High-speed Durability

The same test tire as mentioned above is run at a speed of 150 km/h for 30 minutes, and the speed is raised every 6 km/h if no trouble is caused, and the test is stopped at a time point of causing troubles. The trouble-causing speed is calculated by an index on the basis that Comparative Example 1 is 100, in which the index value exceeds 100 in a direction of raising up a durable limit speed (good direction).

TABLE 1

| | | | Examples | | | | Comparative Examples | | | | |
|---|---|---|---|---|---|---|---|---|---|---|---|
| | | | 1 | 2 | 3 | 4 | 1 | 2 | 3 | 4 | 5 |
| Rubberized fibers | cord | material | PK | PK | PK | PK | nylon | nylon | PK | PK | PK |
| | | structure (dtex) | 1670/2 | 1670/2 | 1670/2 | 1670/2 | 1400/2 | 1400/2 | 1670/2 | 1670/2 | 1670/2 |
| | coating rubber | $M_{100}$ (MPa, room temperature) | 2.5 | 3.0 | 4.5 | 5.0 | 2.0 | 3.0 | 2.0 | 3.0 | 6.0 |
| | | $M_{100}$ (MPa, 100° C.) | 1.8 | 2.1 | 2.9 | 3.3 | 1.5 | 2.1 | 1.5 | 2.2 | 3.9 |
| | | rebound resilience (%) | 66 | 70 | 72 | 72 | 60 | 70 | 60 | 55 | 65 |
| Compounding recipe of coating rubber (part by mass) | | natural rubber | 100 | 100 | 100 | 100 | 100 | 100 | 100 | 100 | 100 |
| | | carbon black HAF | 40 | 42 | 45 | 48 | 38 | 42 | 38 | 44 | 53 |
| | | sulfur | 2 | 2 | 2.5 | 2.7 | 1.8 | 2 | 1.8 | 2 | 3 |
| | | vulcanization accelerator NS | 1 | 1 | 1 | 1 | 1 | 1 | 1 | 1 | 1 |
| | | zinc oxide | 2.5 | 2.5 | 2.5 | 2.5 | 2.5 | 2.5 | 2.5 | 2.5 | 2.5 |
| | | stearic acid | 3 | 3 | 3 | 3 | 3 | 3 | 3 | 3 | 3 |
| Protruding amount at end portion of belt layer (index) | | | 175 | 182 | 190 | 195 | 100 | 101 | 170 | 181 | 200 |
| HSP drum level (index) | | | 127 | 135 | 152 | 158 | 100 | 103 | 105 | 104 | 103 |

As shown in Table 1, when each of the belt reinforcing layers of Examples 1-4 is applied to the tire for the passenger car (PSR), it provides a considerably excellent high-speed durability as compared with those of Comparative Examples 1-5.

EXAMPLE 5

There is prepared a rubberized fiber material for a carcass ply comprising cords and coating rubber shown in Table 1. A material of the cord is a PK fiber, and a structure of the cord is 1670/2 dtex. The coating rubber is made from a compounding recipe shown in Table 2 and has $M_{100}$ (room temperature) of 2.5 MPa, $M_{100}$ (100° C.) of 1.8 MPa and a rebound resilience of 66%. Moreover, the $M_{100}$ and rebound resilience of the coating rubber are measured according to JIS-K-6251-1993 and JIS-K-6255-1996, respectively.

EXAMPLE 6

A rubberized fiber material is prepared in the same manner as in Example 5 except that the amount of carbon black HAF is changed from 40 parts by mass in Example 5 to 42 parts by mass and the $M_{100}$ (room temperature), $M_{100}$ (100° C.) and rebound resilience of the coating rubber are changed to 3.0 MPa, 2.1 MPa and 70%, respectively.

EXAMPLE 7

A rubberized fiber material is prepared in the same manner as in Example 5 except that the amount of carbon black HAF is changed from 40 parts by mass in Example 5 to 45 parts by mass and the amount of sulfur is changed from 2 parts by mass to 2.5 parts by mass and the $M_{100}$ (room temperature), $M_{100}$ (100° C.) and rebound resilience of the coating rubber are changed to 4.5 MPa, 2.9 MPa and 72%, respectively.

EXAMPLE 8

A rubberized fiber material is prepared in the same manner as in Example 5 except that the amount of carbon black HAF is changed from 40 parts by mass in Example 5 to 48 parts by mass and the amount of sulfur is changed from 2 parts by mass to 2.7 parts by mass and the $M_{100}$ (room temperature), $M_{100}$ (100° C.) and rebound resilience of the coating rubber are changed to 5.0 MPa, 3.3 MPa and 72%, respectively.

COMPARATIVE EXAMPLE 6

A rubberized fiber material is prepared in the same manner as in Example 5 except that the cord material in Example 5 is changed to PET and the cord structure is changed to 1400/2 dtex and the amount of carbon black HAF is changed from 40 parts by mass to 38 parts by mass and the amount of sulfur is changed from 2 parts by mass to 1.8 parts by mass and the $M_{100}$ (room temperature), $M_{100}$ (100° C.) and rebound resilience of the coating rubber are changed to 2.0 MPa, 1.5 MPa and 60%, respectively.

COMPARATIVE EXAMPLE 7

A rubberized fiber material is prepared in the same manner as in Comparative Example 6 except that the cord material in Comparative Example 6 is changed to rayon and the cord structure is changed to 1670/2 dtex.

COMPARATIVE EXAMPLE 8

A rubberized fiber material is prepared in the same manner as in Comparative Example 6 except that the cord material in Comparative Example 6 is changed to rayon and the cord structure is changed to 1400/2 dtex.

COMPARATIVE EXAMPLE 9

A rubberized fiber material is prepared in the same manner as in Comparative Example 7 except that the cord material in Comparative Example 7 is changed to PK fiber.

COMPARATIVE EXAMPLE 10

A rubberized fiber material is prepared in the same manner as in Example 8 except that the amount of carbon black HAF is changed from 48 parts by mass in Example 8 to 53 parts by mass and the amount of sulfur is changed from 2.7 parts by mass to 3 parts by mass and the $M_{100}$ (room temperature), $M_{100}$ (100° C.) and rebound resilience of the coating rubber are changed to 6.0 MPa, 3.9 MPa and 65%, respectively.

(Evaluation of Performances)

Each of the rubberized fiber materials obtained in Examples 5-8 and Comparative Examples 6-10 is used in a carcass ply of a tire for a passenger car, and the evaluation is carried out by a drum test for a bead portion durability (using a BF drum as an example). The results are shown in Table 2. Each carcass ply is applied to a test tire having a tire size of 195/65R14, a tire internal pressure of 300 kPa and a rim size of 6J-14 as usual, and then run at a constant speed of 60 km/h under a load corresponding to 200% of a nominal load to measure a service life. The protruding amount of the tire comprising the carcass ply is calculated by an index on the basis that Comparative Example 6 is 100, in which the index value exceeds 100 in a life direction (long).

TABLE 2

|  |  |  | Examples | | | | Comparative Examples | | | | |
|---|---|---|---|---|---|---|---|---|---|---|---|
|  |  |  | 5 | 6 | 7 | 8 | 6 | 7 | 8 | 9 | 10 |
| Rubberized fibers | cord | material | PK | PK | PK | PK | PET | rayon | rayon | PK | PK |
|  |  | structure (dtex) | 1670/2 | 1670/2 | 1670/2 | 1670/2 | 1400/2 | 1670/2 | 1400/2 | 1670/2 | 1670/2 |
|  | coating rubber | $M_{100}$ (MPa, room temperature) | 2.5 | 3.0 | 4.5 | 5.0 | 2.0 | 2.0 | 3.0 | 2.0 | 6.0 |
|  |  | $M_{100}$ (MPa, 100° C.) | 1.8 | 2.1 | 2.9 | 3.3 | 1.5 | 1.5 | 2.1 | 1.5 | 3.9 |
|  |  | rebound resilience (%) | 66 | 70 | 72 | 72 | 60 | 60 | 70 | 60 | 65 |
| Compounding recipe of coating rubber (part by mass) | | natural rubber | 100 | 100 | 100 | 100 | 100 | 100 | 100 | 100 | 100 |
| | | carbon black HAF | 40 | 42 | 45 | 48 | 38 | 38 | 42 | 38 | 53 |
| | | sulfur | 2 | 2 | 2.5 | 2.7 | 1.8 | 1.8 | 2 | 1.8 | 3 |
| | | vulcanization accelerator NS | 1 | 1 | 1 | 1 | 1 | 1 | 1 | 1 | 1 |
| | | zinc oxide | 2.5 | 2.5 | 2.5 | 2.5 | 2.5 | 2.5 | 2.5 | 2.5 | 2.5 |
| | | stearic acid | 3 | 3 | 3 | 3 | 3 | 3 | 3 | 3 | 3 |
| Bead portion durability on drum (index) | | | 125 | 155 | 167 | 175 | 100 | 105 | 109 | 115 | 112 |

As shown in Table 2, when each of the carcass plies in Examples 5-8 is applied to the tire for the passenger car (PSR), it provides a considerably high bead durability as compared with those of Comparative Examples 6-10.

INDUSTRIAL APPLICABILITY

According to the invention, the PK fibers having a high elasticity and a high loss are covered with the coating rubber having given high elasticity and low loss, so that the rigidity balance of PK fibers/rubber and loss characteristic in the rubberized fiber material are improved. Particularly, when the rubberized fiber material is used in the belt reinforcing layer, the high-speed durability of the pneumatic tire can be considerably improved. Also, when the rubberized fiber material is used in the carcass ply, the durability of the pneumatic tire can be considerably improved.

What is claimed is:

1. A rubberized fiber material used in a belt reinforcing layer of a pneumatic tire, characterized in that the rubberized fiber material comprises polyketone fibers having substantially a repeat unit represented by the following formula (I):

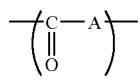
(I)

(wherein A is a moiety derived from an ethylenically unsaturated compound polymerized through ethylenic linkage, and may be same or different in repeat units) and a coating rubber covering the fibers, and the coating rubber has a modulus at 100% elongation (room temperature) of not less than 2.5 MPa but not more than 5.5 MPa and a rebound resilience at 23° C. of not less than 60%, wherein the coating rubber has a rubber component consisting of natural rubber.

2. A rubberized fiber material used in a carcass ply of a pneumatic tire, characterized in that the rubberized fiber material comprises polyketone fibers having substantially a repeat unit represented by the following formula (I):

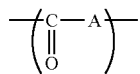
(I)

(wherein A is a moiety derived from an ethylenically unsaturated compound polymerized through ethylenic linkage, and may be same or different in repeat units) and a coating rubber covering the fibers, and the coating rubber has a rubber component consisting of natural rubber and has a modulus at 100% elongation (room temperature) of not less than 2.5 MPa but not more than 5.5 MPa and a rebound resilience at 23° C. of not less than 60%.

3. A rubberized fiber material according to any one of claims 1 to 2, wherein A in the formula (I) is an ethylene group.

4. A pneumatic tire comprising a belt reinforcing layer, characterized in that the belt reinforcing layer comprises polyketone fibers having substantially a repeat unit represented by the following formula (I):

(I)

(wherein A is a moiety derived from an ethylenically unsaturated compound polymerized through ethylenic linkage, and may be same or different in repeat units) and a coating rubber covering the fibers, and the coating rubber has a modulus at 100% elongation (room temperature) of not less than 2.5 MPa but not more than 5.5 MPa and a rebound resilience at 23° C. of not less than 60%, wherein the coating rubber has a rubber component consisting of natural rubber.

5. A pneumatic tire comprising a carcass ply, characterized in that the carcass ply comprises polyketone fibers having substantially a repeat unit represented by the following formula (I):

(I)

(wherein A is a moiety derived from an ethylenically unsaturated compound polymerized through ethylenic linkage, and may be same or different in repeat units) and a coating rubber covering the fibers, and the coating rubber has a modulus at 100% elongation (room temperature) of not less than 2.5 MPa but not more than 5.5 MPa and a rebound resilience at 23° C. of not less than 60%, wherein the coating rubber has a rubber component consisting of natural rubber.

6. A pneumatic tire according to claim 4 or 5, wherein the pneumatic tire is a tire for a passenger car.

* * * * *